(12) United States Patent
Shevade (10) Patent No.: US 8,090,950 B2
(45) Date of Patent: Jan. 3, 2012

(54) SYSTEM AND METHOD FOR AUTHENTICATING DOCUMENTS

(75) Inventor: Ravindra Waman Shevade, Maharashtra (IN)

(73) Assignee: NexTenders (India) Pvt. Ltd. (IN)

( * ) Notice: Subject to any disclaimer, the term of this patent is extended or adjusted under 35 U.S.C. 154(b) by 1146 days.

(21) Appl. No.: 10/553,067

(22) PCT Filed: Apr. 8, 2004

(86) PCT No.: PCT/GB2004/001549
§ 371 (c)(1), (2), (4) Date: Jul. 10, 2007

(87) PCT Pub. No.: WO2004/091135
PCT Pub. Date: Oct. 21, 2004

(65) Prior Publication Data
US 2008/0028439 A1    Jan. 31, 2008

(30) Foreign Application Priority Data
Apr. 11, 2003 (GB) .................................. 0308422.5

(51) Int. Cl.
*H04L 9/32* (2006.01)
(52) U.S. Cl. ........ 713/176; 380/200; 380/277; 713/164; 713/170; 713/178
(58) Field of Classification Search .................... 713/176
See application file for complete search history.

(56) References Cited

U.S. PATENT DOCUMENTS

| | | | |
|---|---|---|---|
| 5,619,571 A * | 4/1997 | Sandstrom et al. | 380/200 |
| 5,781,629 A * | 7/1998 | Haber et al. | 713/177 |
| 6,188,766 B1 * | 2/2001 | Kocher | 380/246 |
| 6,226,618 B1 * | 5/2001 | Downs et al. | 705/51 |
| 6,463,535 B1 * | 10/2002 | Drews | 713/176 |

(Continued)

FOREIGN PATENT DOCUMENTS
EP    1081890 A2    3/2001
(Continued)

OTHER PUBLICATIONS

"Ensuring Record Integrity with AbsoluteProof", undated, at http://www.surety.com/docs/AbsoluteProofWhitepaper_final1.pdf, 18 pages.

(Continued)

*Primary Examiner* — Taghi Arani
*Assistant Examiner* — Mahfuzur Rahman
(74) *Attorney, Agent, or Firm* — Knobbe Martens Olson & Bear LLP (57) ABSTRACT

A data processing system for distributing and authenticating documents from a plurality of parties to a recipient data processing apparatus is disclosed. The system comprises a plurality of document distribution devices each configured to generate an original hash value from the content of a file containing a document to be distributed. A recipient data processing apparatus is configured to generate an original super hash value from the plurality of the original hash values, and to distribute the original super hash value to each of the document distribution devices. The system provides assurance that distributed documents have not been tampered with during communication, by an unscrupulous distributing party, or by an unscrupulous recipient by only submitting a hash value of the document to be distributed. The hash value provides for assurance at the eventual recipient of the document that no changes to the document have been made.

24 Claims, 6 Drawing Sheets

U.S. PATENT DOCUMENTS

| | | | | |
|---|---|---|---|---|
| 6,510,513 | B1* | 1/2003 | Danieli | 713/156 |
| 6,584,565 | B1* | 6/2003 | Zamek | 713/156 |
| 6,785,815 | B1* | 8/2004 | Serret-Avila et al. | 713/176 |
| 6,948,069 | B1* | 9/2005 | Teppler | 713/178 |
| 6,959,384 | B1* | 10/2005 | Serret-Avila | 713/176 |
| 7,117,367 | B2* | 10/2006 | Carro | 713/176 |
| 7,143,144 | B2* | 11/2006 | Kanai et al. | 709/217 |
| 7,222,238 | B2* | 5/2007 | Bleumer et al. | 713/177 |
| 7,266,698 | B2* | 9/2007 | Matsumoto et al. | 713/178 |
| 7,401,220 | B2* | 7/2008 | Bolosky et al. | 713/165 |
| 7,457,951 | B1* | 11/2008 | Proudler et al. | 713/164 |
| 7,519,824 | B1* | 4/2009 | Peyravian et al. | 713/178 |
| 7,636,848 | B2* | 12/2009 | Caprella et al. | 713/176 |
| 7,747,858 | B2* | 6/2010 | Serret-Avila et al. | 713/168 |
| 2002/0026583 | A1* | 2/2002 | Harrison et al. | 713/172 |
| 2002/0122568 | A1* | 9/2002 | Zhao | 382/100 |
| 2003/0023851 | A1 | 1/2003 | Peha | |
| 2003/0159048 | A1* | 8/2003 | Matsumoto et al. | 713/178 |
| 2003/0182552 | A1* | 9/2003 | Tanimoto et al. | 713/170 |

FOREIGN PATENT DOCUMENTS

| | | |
|---|---|---|
| WO | WO 97/12460 | 4/1997 |

OTHER PUBLICATIONS

"Digital Timestamps: Punching an Electronic Clock", The New York Times, Jan. 10, 1999, Google cache of http://itinerant.net/archives/technology/10notary.html, 4 pages.

"Surety Announces AbsoluteProof Enterprises Data Integrity", Mar. 31, 2003, at http://www.eetimes.com/pressreleases/prnewswire/66241, 2 pages.

* cited by examiner

SYSTEM AND METHOD FOR AUTHENTICATING DOCUMENTS

FIELD OF THE INVENTION

The present invention relates to data processing systems, apparatus and methods for distributing and authenticating documents from a plurality of parties to a recipient data processing apparatus.

BACKGROUND OF THE INVENTION

Many communications related tasks and applications, which have conventionally been dealt with by mail, telephone or personal contact, have been evolved into a web-based form in which communications is effected using the internet. One reason for this evolution is that the internet can provide a facility for communicating information more efficiently and quickly than conventional forms of communication. However, one disadvantage of the internet concerns security and privacy, since data communicated via the internet can be intercepted, altered and/or divulged to other parties.

For certain applications, it is necessary for a number of users to submit documents to a recipient data processing apparatus. For example users may be required to submit the documents to the recipient data processing apparatus, where the recipient apparatus is only able to operate on the received data after a predetermined event, such as the expiration of a time limit. Under these circumstances privacy, authentication and security of each submitted and received document should be maintained from the point of submission of the document until, and potentially after, the time limit has expired. For document distribution and authentication, concerned parties require assurance that a document communicated via the internet has not been tampered with, either to alter the document in some way or to determine the content of the document.

One example where secure document distribution and authentication is required is contract tendering, another example being a closed bidding process in which sealed bids are communicated to a vendor. For the closed bidding process the vendor is able to open the sealed bids and select the most appropriate bid, after all bids have been received.

For the example of a tendering process, tenders for a contract are submitted in a sealed form, which are deposited in a closed tender box until a date has passed. After the appropriate date, the tenders are opened and revealed to an administrator of the contract. The most appropriate bid may then be selected, with assurance that the bids are competitive, in the sense that there has been no collusion between the bidding parties. However, to ensure that competition has been maintained and the contract has been awarded on a fair basis, both the bidding parties and the contract administrator require assurance that the bids or tenders cannot be opened and/or modified by a competitor, otherwise a competitor may gain an unfair advantage. On the other hand the tendering parties want assurance that bids or offers submitted have not been opened by anyone without authorisation, especially before a due date and time.

One possible remedy for the disadvantages associated with communication vis the internet is to encrypt data. Previously proposed e-transaction security procedures include two methods, which are frequently combined:
  (i) users use digital id's to prove their identity (akin to a signature), and
  (ii) data is encrypted using some form of Public Key Infrastructure (PKI) where a combination of public/private keys ensures that only those who have the private key have the authorisation to decrypt encrypted data.

However, if encryption fails, encryption does not generally provide any indication that an abuse has occurred. A corrupt user with all the relevant authorisations may use the encryption key to access bids or tenders before a due date/time, thereby being able to favour one competitor over another. Similarly, a tendering party or bidder with all the relevant authorisations may use the encryption key to access and modify its own data after a time/date that the bids/offers have been time locked and frozen. Furthermore a hacker, whether interested in the tender or otherwise, could hack into the server and manipulate data It would be desirable to provide a system, which can utilise data communications networks such as, for example, the internet, for document distribution, which provides improved assurance of authentication and security of the distributed documents.

SUMMARY OF INVENTION

According to the present invention there is provided a data processing system for distributing and authenticating documents from a plurality of parties to a recipient data processing apparatus. The system comprises a plurality of document distribution devices each operable to generate an original hash value from the content of an electronic file containing a document to be distributed. A data communications network is operable to provide a facility for communicating each of the original hash values to the recipient data processing apparatus. The recipient data processing apparatus is operable to receive the original hash value from each of the plurality of document distribution devices via the data communication network, and to generate an original super hash value from the plurality of the original hash values received. The recipient data processing apparatus is operable to communicate the original super hash to the plurality of document distribution devices.

After a predetermined event, the plurality of document distribution devices is operable to communicate each of the respective electronic files to the recipient data processing apparatus. The recipient data processing apparatus is operable to generate a comparative hash value from the content of the electronic file containing the document received from each of the document distribution devices, and to generate a comparative super hash value from each of the comparative hash values. The recipient data processing apparatus is operable to communicate the comparative super hash value to each of the document distribution devices, and to determine whether or not the documents received by the recipient data processing apparatus have changed. The recipient data processing apparatus determines whether a document has changed from a comparison of at least one of the original hash values and the comparative hash values and the comparative super hash value and the original super hash value.

The predetermined event may be, for example, a particular time or date at which the documents are to be received, or may be when a predetermined number of documents have been received.

In some embodiments the data communications network may include the internet, an intranet, a Local Area Network (LAN) or a Wide Area Network (WAN). In other embodiments the data communications network may include a postal system, the documents being distributed in electronic form on a data carrier.

Documents can be of several types, for instance they could be generic documents created by proprietary systems applications such as Microsoft Office (RTM), Adobe Acrobat (RTM), or the documents could be user generated data files. Documents could also be "system forms", either standard as provided by a system provider or a customised variant created by a sender, in dependence upon the specific needs of users. Of course data sent from a sender to a recipient could comprise of multiple document types.

Embodiments of the present invention can provide a system, for distributing documents via a data communications network, with improved authentication and assurance that documents being distributed have not been tampered with during communication or by an unauthorised recipient. The improvement is provided at least in part by only submitting a hash value of the document to be distributed to the recipient data processing apparatus. The hash value provides a quasi-unique identification of the content of the document. However, the document itself is not submitted, but the eventual recipient of the document can be assured that no changes to the document have been made by comparing the original hash value with a re-generated (comparative) hash value. As a result, the content of the document can be with-held until after a date when the documents should be submitted. However, the hash value is provided as assurance that the document when it is submitted has not been changed from the form when the original hash value has been generated.

A comparative hash value which has changed with respect to an original hash value can provide an indication of a particular document which has changed, which can therefore be used to identify a document distribution device from which the changed document originated. Furthermore, the super hash value can also provide the recipient data processing apparatus with an indication as to whether or not any of the documents, which have been submitted, have been changed. Therefore an indication of an overall integrity of a particular set of documents, which might be submitted for example in a document tendering process, is provided from a comparison of either the original hash values with the comparative hash values or from a comparison of the original superhash value and the comparative super hash value, or both.

According to embodiments of the invention, the recipient data processing apparatus communicates the original super hash value to the plurality of document distribution devices, and communicates the comparative super hash value to each of the document distribution devices. Forming the original super hash value, before the documents are submitted, and forming a comparative super hash value from the comparative hash values generated from the submitted documents, provides all parties, which are distributing documents, with at least some assurance that none of the other distributing parties have changed their documents, or that the documents have been altered on the recipient side.

Distribution systems embodying the present invention therefore have an advantage that the documents are not available on a network until all submissions by other parties have been made, or until no other such submissions can be made. The information content of the document to be submitted therefore cannot be used to prejudice those other parties in the submission of their own documents.

Furthermore each user is unable to amend his/her documents once the hash has been sent to the recipient, without the recipient (and potentially all other users) becoming aware of the discrepancy once the modified document is submitted.

Moreover, it is difficult for a user or a third party (such as a hacker) to modify a document either on the document distribution devices or the recipient apparatus without such alteration being identified by either the recipient or by the distributing parties. This is because such an alteration would almost certainly change the comparative hash values and the comparative super hash values.

Embodiments of the invention find application not only with tender management and closed bidding but with other forms of document distribution such as electronic transaction processing and data/document exchange that requires data to be stored on a server for a time period during which period the data must remain secure.

Various further aspects and features of the present inventions are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE EXAMPLE EMBODIMENTS

Distribution System

Figure 1:
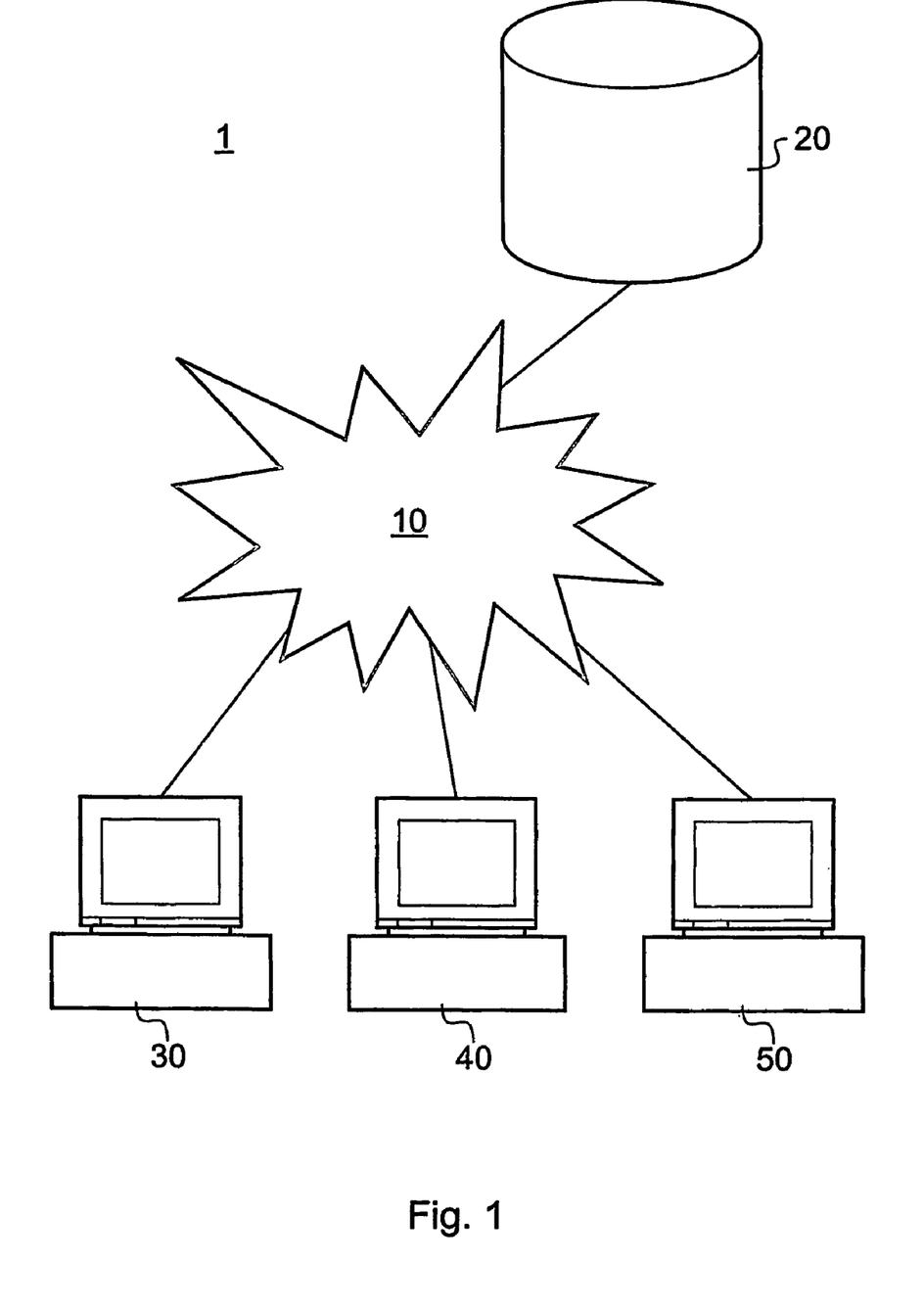
FIG. 1 is a schematic illustration of a secure document transmission system in accordance with embodiments of the present invention.

Referring to FIG. 1, a secure document transmission system 1 for distributing and authenticating documents from a number of parties to a recipient data processing apparatus according to an embodiment of the invention includes a plurality of document distribution devices 30, 40, 50, a data communications network 10 and a recipient data processing apparatus 20. The document distribution devices may be remote client terminals which are arranged to communicate with the recipient data processing apparatus 20 via the data communications network 10. The recipient data processing apparatus 20 may form a server to the client terminals 30, 40, 50. In one embodiment, the communications network includes the internet, but the network may also include an Intranet, a Local Area Network (LAN) or a Wide Area Network (WAN). However, in other embodiments the data communications network may include a postal service. For such an example, documents may be distributed on a data carrier such as a diskette, CD ROM or Zipdisk, which may be posted in a sealed envelope to the recipient for loading manually onto the server.

Data transmission between the document distribution devices 30, 40, 50 and the recipient data processing apparatus 20 could take place using a basic communications protocol such as HTTP (Hypertext Transfer Protocol) or FTP (File Transfer Protocol), or alternatively by a more secure communications protocol such as HTTPS (HTTP, Secure). HTTPS is HTTP with an underlying SSL layer (Secure Sockets Layer) which sits on top of the connection protocol TCP/IP to provide additional security.

In one example application for embodiments of the invention, a number of remote users submit data to a centralised apparatus or server. The recipient apparatus performs a given function on the received data once a predetermined event has occurred or been is satisfied. This predetermined event could be a time limit which expires on a certain date, the receipt of data from all potential remote users, or some other predetermined condition which must be satisfied, including a recipient deciding to close a tendering or bidding process prematurely. Under these circumstances it is important to ensure that the privacy and security of each submitted and received document is maintained from the point of submission until (and potentially after) a data processing function has been completed.

Document Distribution Device

Figure 2:
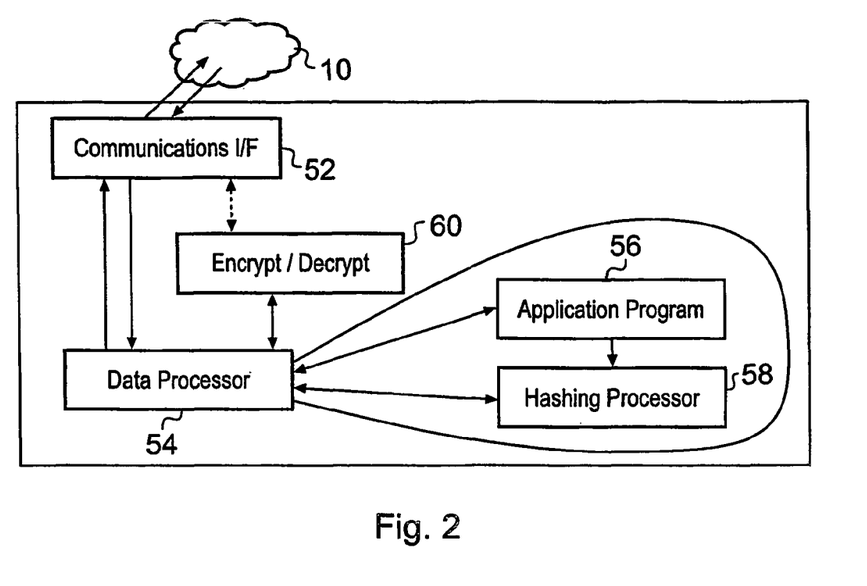
FIG. 2 is a schematic block diagram of a document distribution apparatus, which is shown in FIG. 1.

An example implementation of a document distribution device is provided in FIG. 2. In FIG. 2, the document distribution device 50 includes a communication interface 52 for sending and receiving data using the data communications network 10. A central data processor unit 54 controls the communications interface 52, to send and receive data. In one example implementation the central data processor unit 54 is a CPU of a computer, which is arranged to execute software application programs. For this example, the central data processor unit supports the operation of an application program 56, which is arranged under user control to create a document for communication. The document could be generated using for example a conventional proprietary word processing application program such as Word Perfect, Microsoft Word etc.

The central data processing apparatus supports a hashing processor 58. In operation, the application program 56 under user control produces a document as a file in electronic form. The document is to be submitted to the recipient data processing apparatus 20 as part of, for example, a tendering process. However, rather than submitting the electronic file, the hashing processor 58 is applied to generate an original hash value. It is the original hash value, which is communicated to the recipient data processing apparatus, via the data communications network 10.

After a predetermined event, the central data processor unit 54 is arranged to communicate the electronic file representing the document to the recipient data processing apparatus 20 via the data communications network 10. For the example application of a tendering process, the predetermined event may be the expiration of a particular time limit on, for example a particular date.

After the tendering process has been closed, the recipient data processing apparatus is arranged to generate a super hash value, from a combination of the hash values received from all the document distribution devices 30, 40, 50 taking part in the tendering process. The super hash value, referred to as an original super hash value, is received by the document distribution devices 30, 40, 50 from the recipient data processing apparatus.

At this time the tender documents are submitted by each of the document distribution devices for inspection. Submission can be effected in various ways. For the example illustrated in FIG. 2, the electronic files are communicated via the communications interface 52 to the recipient data processing apparatus.

After submission of the tender documents, the recipient data processing apparatus re-generates each of the hash values from the received electronic files representing the submitted documents using the same hashing process as that performed by the document distribution devices 30, 40, 50. A super hash value is again formed from the re-generated hash values. The central data processor unit 54 therefore receives the re-generated (comparative super) hash value via the communications interface 52. By comparing the original super hash value with the re-generated super hash value a user of the data processing apparatus 50 is provided with at least some assurance that all the originally generated documents for a tender have not changed and that therefore the tender process is fair.

For the above described embodiments a software program could be provided, which when loaded onto a personal computer, enables the computer to act as a document distribution apparatus as described.

Recipient Data Processing Apparatus

Figure 3:
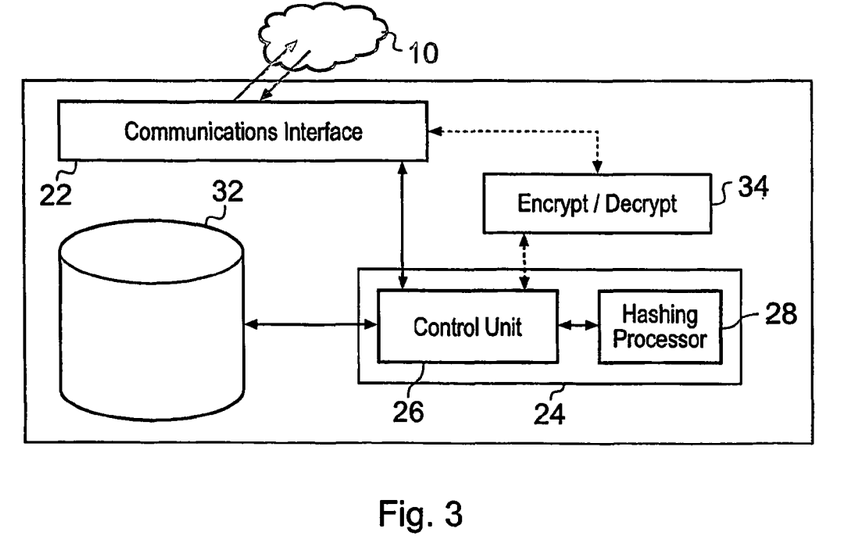
FIG. 3 is a schematic block diagram of a recipient data processing apparatus, which is shown in FIG. 1.

The recipient data processing apparatus 20 is shown in more detail in FIG. 3. The recipient data processing device includes a communication interface 22 for communicating data via the data communications network 10. A data processing apparatus 24 includes a control unit 26 and a hashing processor 28.

The data processor 22 is arranged under the control of the control unit 26 to receive the original hash values generated by the document distribution devices 30, 40, 50 from the electronic files representing the documents to be submitted. The control unit 26 uses the hashing processor 28 to generate an original super hash value from the original hash values generated by each of the document distribution devices 20, 30, 40. The original super hash value is then communicated by the communications interface 22 to each of the document distribution devices 30, 40, 50. The original super hash value is stored in a data store 32 in association with the original hash values and data identifying the document distribution device, which generated a corresponding one of the original hash values.

After the predetermined event has occurred, such as the end of a tendering period, the data processor 22 is arranged under the control of the control unit 26 to receive the electronic files representing submitted documents via the communications interface 22 from the data communications network 10. The electronic files are stored under control of the control unit 26 in the data store 32 in association with the original hash values, the original super hash value and the data identifying the corresponding document distribution device which produce the original hash value.

After the documents have been submitted the control unit 26 re-generates each of the hash values for each of the received electronic files representing the tender documents using the hashing processor 28. The re-generated hash values are referred to as comparative hash values. The control unit 26 then forms a comparative super hash value using the hashing processor 28 by applying the same hashing process used to form the original super hash value. The comparative super hash value is then communicated using the communications interface 22 via the data communications network 10 to the document distribution devices 30, 40, 50.

The recipient data processing apparatus provides a facility for reducing a possibility for a tendering process to be corrupted, because the actual tender documents are not required to be submitted until after the tender has closed. However, submitting the hash values representing the documents provides a quasi-unique identification of the tender documents, which can therefore be used as evidence that the documents have not been changed between completion and actual submission.

Encryption

As explained, each of the document distribution devices 30, 40, 50 is arranged, under control of a user, to generate a document for transmission to the recipient data processing apparatus 20. There are various ways in which a document could be distributed. The document could be prepared offline (i.e. when the client terminal is not in communication with the central server), or online (when the client terminal is in communication with the central server). As such the document distribution device could be adapted to the effect that the central data processor unit 54 could be arranged to execute a client-side browser for accessing an on-line session supported by the data processor 24 of the server-side recipient data processing apparatus For the example of on-line data submission, data stored on the server or in transit over the internet may be encrypted, using, for example, a PKI (Public Key Infrastructure) system to reduce a possibility of details of the document being viewed or tampered with by a third party. To this end, the document distribution device may include an encryption/decryption processor 60, and the recipient data processing apparatus may include an encryption/decryption processor 34.

In a PKI system, for example, a public and private key are generated by the same algorithm. A private key is given to each user (both of the document distribution devices 30, 40, 50, and of the recipient data processing apparatus), and the public key is openly available to other users. The private key is never shared with any one or sent across the network 10. The private key is used to decrypt data that has been encrypted using the corresponding public key, the private key being essential for the decryption of the data. Additionally, the PKI system can be used for authentication of a document sent over the network 10 by using the private key to encrypt a digital certificate to be attached to the document, which can then be decrypted by the public key, which would be available to the recipient. Only the sender (or someone else with access to the private key) could create the encrypted digital certificate, and so strong evidence of origin is provided.

Generating Hash Values

"Hash generation" is the application of a mathematical algorithm to any data set to generate a unique or quasi-unique numerical code or mathematical "fingerprint" of the original data. As a result, no two different data sets should ever have the same hash, and so a hash uniquely identifies the data set it originated from. Any changes to the original data would result in a new hash that would necessarily be different to the original hash. In one implementation, where a document to be sent actually comprises a package containing several document types, it is the entire package that is hashed.

There are various techniques, which could be employed to generate an appropriate hash value. Hash values may be generated using techniques described in the US Department of Commerce publication "FIPS PUB 180-1"—"Secure Hash Standard", published on 17, Apr. 1995. This document describes a secure hashing standard (Secure Hash Algorithm SHA-1). The SHA-1 can therefore be used to generate the original and the comparative hash values. The original super hash values and the comparative super hash values can also be generated using the techniques of SHA-1 by applying the SHA-1 on a set of hash values to generate a "hash of hashes" which is one example technique for generating super hash values.

Additionally, Digital Signatures may be generated to 'prove' the identity of the sender of a message using techniques described in publication "FIPS PUB 186"—"Digital Signature Standard" (DSS). DSS prescribes the algorithm used for digital signature generation and verification. DSS also specifies the criteria for the public and private keys required by the algorithm.

For example, a sender inputs a message (which could be a document, a hash, or a super hash) into the SHA-1 to generate a hash of the message. This is then input into the DSS algorithm using a private key to generate a digital signature of the sender. The message and the digital signature are then sent to the recipient. On receipt the recipient inputs the message into the SHA-1 and generates a comparative hash of the message. This comparative hash of the message is then input into the DSS using the sender's public key to verify the sender's digital signature.

As will be appreciated the use of the DSS algorithm to provide a digital signature is optional to the document distribution system but provides an added layer of security. The fact that the use of DSS requires the SHA is independent of the use of the SHA for generating hash values.

SUMMARY OF OPERATION

Figure 4:
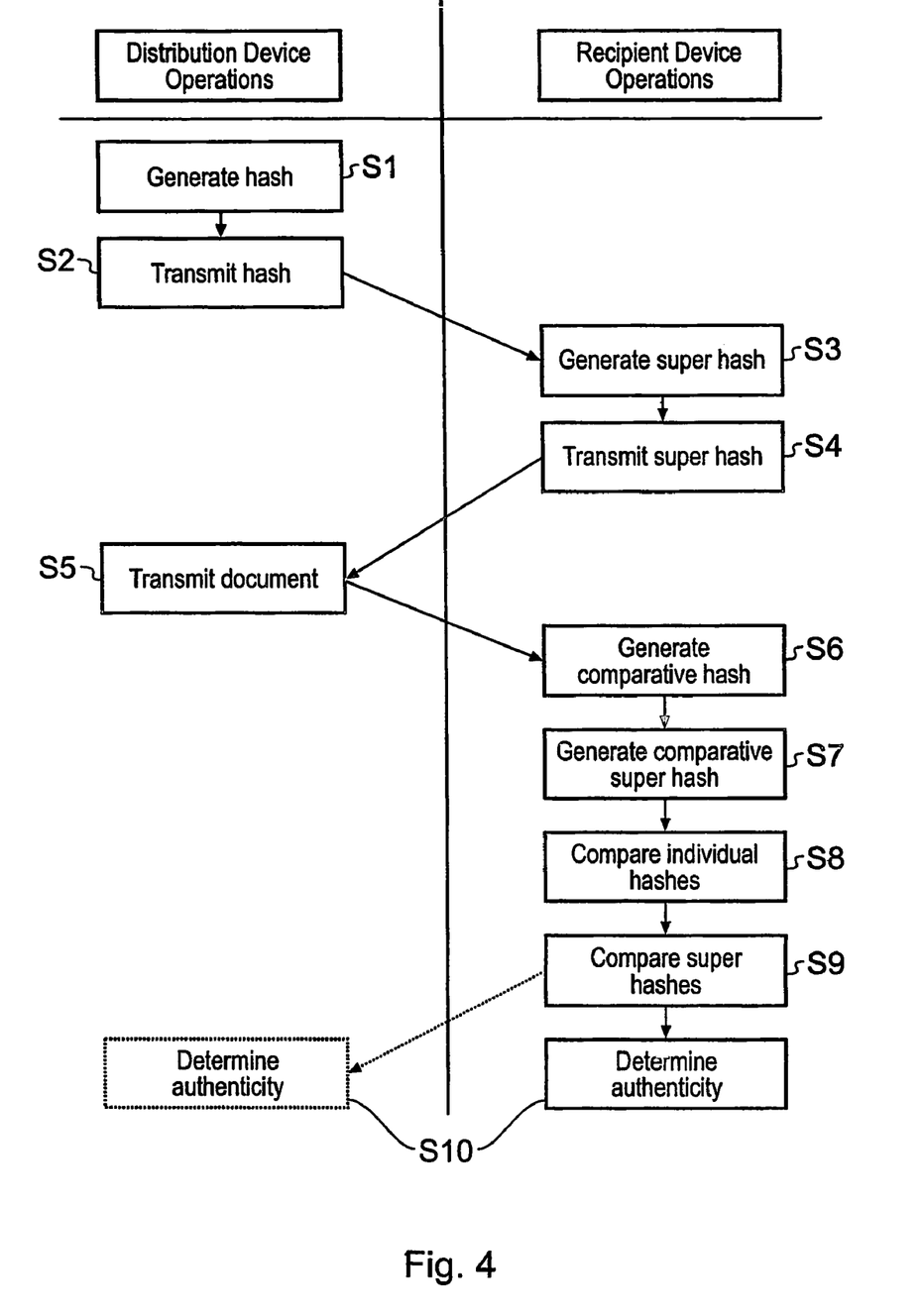
FIG. 4 is a flow diagram illustrating the steps involved in securely transmitting data in accordance with embodiments of the present invention.

FIG. 4 provides a flow diagram representing the operation of the system described above. The left hand side of FIG. 4 illustrates operations carried out by the distribution device 30, 40, 50, and the right hand side illustrates operations carried out by the recipient device 20.

The method starts at step S1 with the generation of a hash from the document desired to be eventually transmitted from the distribution device 30, 40, 50 to the recipient device 20.

In step S2, the hash is transmitted to the recipient device 20 over the communications network 10. As outlined above with reference to FIG. 1, various security protocols may be utilised to improve the security of the transmitted data during transfer. The hash will then be received by the recipient device 20.

Step S3 only commences once a predetermined event has occurred. As described above, this event could be the expiration of a time limit, the receipt of all potential documents, or some other criteria. When the predetermined event occurs, no further hashes can be received as part of the current process. The recipient device 20 then generates, from the combination of all received hashes, a "hash of hashes" (or "super hash") that fingerprints the entire set of received hashes.

In step S4, the super hash is transmitted to the distribution device 30, 40, 50. The receipt of the super hash by the distribution device 30, 40, 50 enables the operator of the distribution device to keep track of security, and may also act as a trigger for the actual document itself to be sent over the network 10, to the recipient device 20 (step S5). As described with respect to step S2, transmission steps S4 and S5 can be protected during transmission by security protocols.

In step S6, on receipt of the document itself, the recipient device 20 generates a comparative hash from the document. Comparative hashes will also be generated by the recipient device 20 for all other documents received in the current process from other distribution devices 30, 40, 50.

In step S7, when documents from all distribution devices 30, 40, 50 have been received and hashed by the recipient device 20, the recipient device 20 will generate a comparative super hash from all the comparative hashes.

In step S8, each comparative hash is compared to its corresponding original hash sent from the distribution device 30, 40, 50 to the recipient device 20 in step S2. If any changes were made to the document on the distribution device 30, 40, 50 between the original hash being generated and the document itself being hashed at the recipient device 20 then there will be a mismatch between the original and comparative hashes. An alteration could have taken place either on the distribution device 30, 40, 50 between steps S2 and S5, or on the recipient device 20 between steps S5 and S6.

In step S9, the comparative super hash is compared to the original super hash generated from the received hashes in step S3. If any changes have been made to any document, and/or if one or more document is missing as compared to the received hashes, then there will be a mismatch between the original and comparative super hashes.

In step S10, the system 1 identifies whether steps S8 and S9 have resulted in matches or mismatches of the hashes or super-hashes. This step may include both the distribution device 30, 40, 50 and the recipient device 20, with the effect that all parties have confidence and some degree of assurance in the document transmission process. Alternatively, only the recipient device 20 may perform the process step S10, confirming that the correct hash and super-hash values have been provided.

The step S10 determines the authenticity of the transmitted documents. Where there is a mismatch, it is possible to identify the nature and the origin of the problem, and to take remedial action accordingly. This information can be made available either to the user of the recipient device 20 only, or to all or a subset of distribution device 30, 40, 50 users.

Tendering Process

Figure 5:
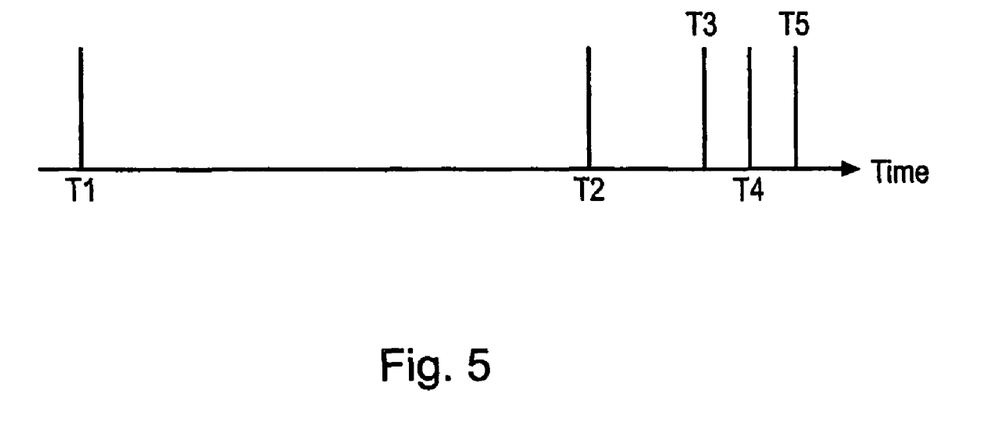
FIG. 5 is a schematic time-line diagram of an electronic tendering process implementing the data processing system and method according to an embodiment of the present invention.

Electronic tendering is an example application suitable for the present invention. FIG. 5 schematically illustrates, using a timeline, a tendering system implementing an embodiment of the present invention. At time T1, the tender is opened, and the tendering system is open to receive bids. Bids can be made until the tender closes at time T2. Clearly, a tendering server (recipient device 20) cannot determine the winning bid until all bids (in the form of documents) have been received at the tendering server, or until a certain time limit has been reached. As a result, some documents including bids may lie dormant on the tendering server 20 for some time (e.g. up to duration=T2–T1 which could be days or weeks) before being processed along with the other received bids. During this time, these documents may be vulnerable to viewing or alteration, which undermines the privacy and security of the tendering system.

Previously, following the preparation of a bid, the finalised bid would be sent to the tendering server 20 via a network 10. This process would lead to the vulnerabilities outlined above. With the present system, instead of sending the finalised bid between times T1 and T2, a hash is generated from the document containing the bid and sent to the tendering server 20 between times T1 and T2. The document itself is not sent at this point. Where certification of origin and time of creation/modification is required, the hash can be signed with the bidder's private key and time stamped.

The hash will be received by the tendering server 20 and stored. Hashes may also be received from any other participating bidders until time T2.

At time T2, the tendering server 20 generates the super hash as described above with reference to FIG. 2. The super hash can then be sent to each participating bidder, optionally signed with the private key of the tendering server 20 and time stamped. All bidders will have received the super hash by time T3. At time T3 each bidder will submit (either manually, or preferably automatically) the original document to the tendering server 20. The document could optionally be encrypted using the public key of the tendering server 20 and time stamped. Where encryption is used, the tendering server 20 will need to use its own private key to decrypt the received document.

At time T4, the tendering server will have received all original documents. These will be opened and stored to the tendering server 20, and hashes will be generated from each of these bid documents and compared to the corresponding original hashes received by the tendering server 20 between time T1 and T2. Further, a comparative super hash of all the comparative hashes will be generated. If the original finalised bids had been received from all bidders, then each comparative hash would match its corresponding original hash and the comparative super hash would be identical to the original super hash. If any one or more of the documents was not received, or if any one or more of the documents had been altered at the bidders terminal 30, 40, 50 between submitting the hash and submitting the document, then the two super hashes would not match. The result of this match or mismatch will be available to the user of the tendering server 20 and potentially to the bidders.

At time T5, where the hashes and super hashes match, the tendering process has been successful and the tendering server 20 can proceed to determine the winning bidder. Where there is a mismatch, remedial action can be taken. This remedial action could take a number of forms. For instance, where a final bid was not received (between T3 and T4), this could be the result of a transmission failure, either at the client end, the server end, or over the communications network 10. In such a case it may be appropriate to simply notify the user concerned and arrange for the document to be sent again, the validity of the re-sent document being easily ascertainable by virtue of the hash/super hash procedure described above. Alternatively, where the hash/super hash procedure identifies that a particular document has been altered, the user concerned can be identified and their document either disregarded, or the whole tendering process cancelled.

Figure 6:
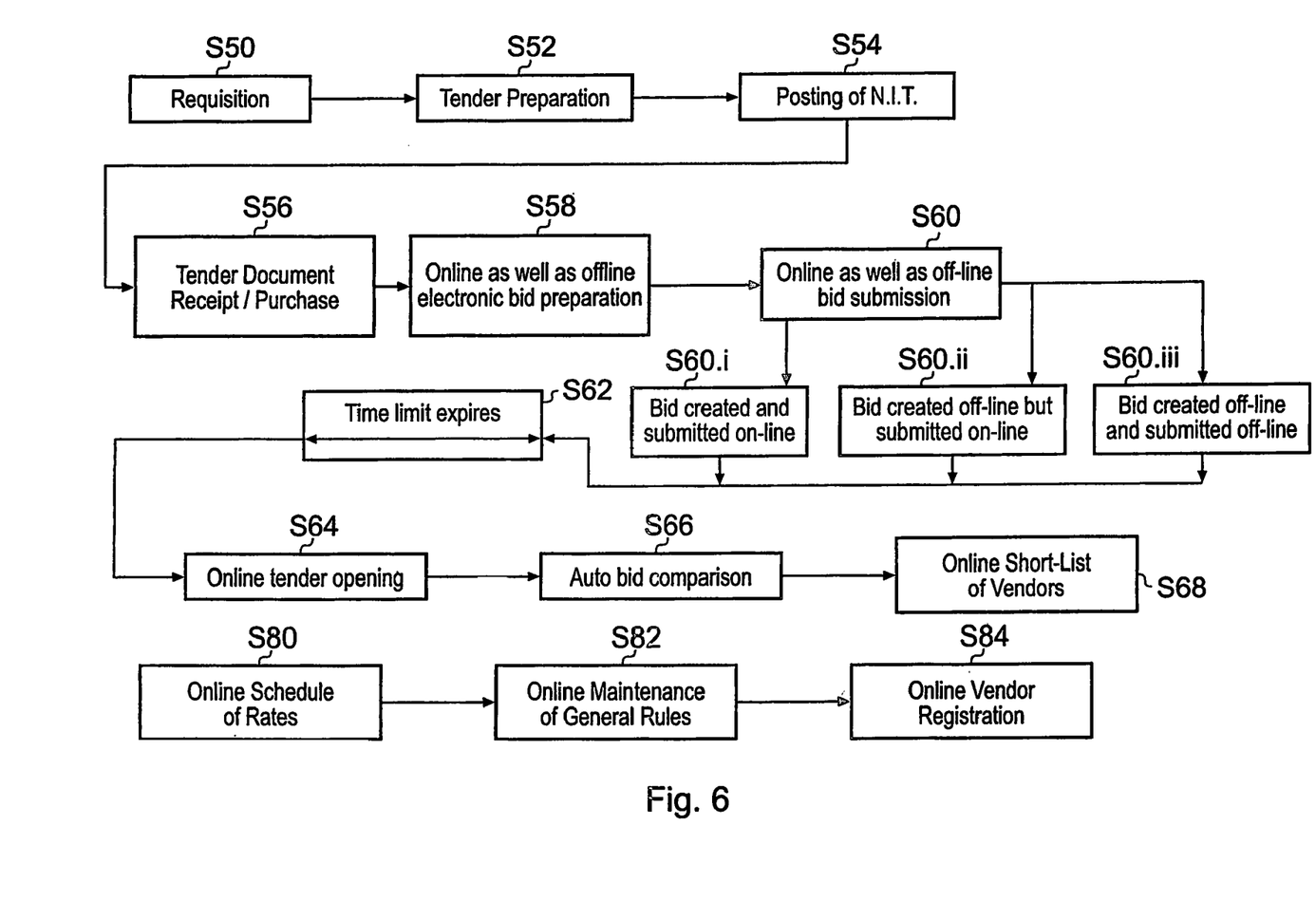
FIG. 6 is a schematic block diagram of a tendering process implementing the data processing system and method according to an embodiment of the present invention.

A summary application of the example implementation of the system for submitting tendering is shown in FIG. 6. The example tendering process conforms substantially to government contract tendering, the steps of which are summarised as follows:

S50: As a first step, an organisation identifies a need to fill a task, project or service from an outside agency or company. The requirements to be fulfilled by a tendering party are therefore identified;

S52: The requirements identified in step S50 are used to prepare a tender for the task to be fulfilled, which are used to define a Notice Inviting Tenders (NIT), which is posted;

S54: Posting of the NIT can be effected by putting an appropriate advertisement in a newspaper, by posting on the internet or by any other convenient means for communicating the invitation to tender to the intended audience (for example, a closed tender will only be communicated to a limited number of vendors, but an open tender needs to be communicated in the public domain);

S56, S58, S60: These are steps required for interested parties to submit their bids in response to the tender invited. In S56, an interested party receives tender documents prepared by the tendering organisation and relating to the tender invited, which can provide more specific details of the tender to be fulfilled. These tender documents give details of the task, work or project required, such as for example the scope of work, technical specifications, qualifying criteria for bidders, amount of refundable security deposit required, revenue model desired, proposed contract terms, etc. Frequently these tender documents are required to be purchased from the organisation by interested parties. In S58 a bid document may be created, either on-line or off-line using electronic bid preparation software or generic third party document creation software (such as Microsoft Office (RTM) and PDF), by generating an electronic file of the bid. In S60 the bid document may be submitted in one of three ways:

S60(i): If the bid document is created online in S58, it may be submitted online;

S60(ii): If the bid document is created offline in S58 using either bid preparation software or generic document creation software, it can be submitted online;

S60(iii): If the bid document is created offline in S58 using either bid preparation software or generic document creation software, it can be stored on a data carrier such as a diskette, CD ROM or Zipdisk and submitted in a sealed envelope.

Note that as explained below, in both S56 and S60 the tendering organisation may require interested parties to make payments such as tender document purchase fees and security/earnest money deposits (the latter against bids). These payments may be made either online (by integrating electronic payment mechanisms with these steps) or offline as per the choice of the tendering organisation.

S62: A predetermined time limit expires, which may be set as a particular date before which tender documents must be submitted;

S64: After the tender date has passed, the documents may be opened on-line.

S66: An automatic bid comparison may be effected in which some tenders may be automatically selected or eliminated from the tendering process.

S68: A short-list of vendors may be identified, and if appropriate a request for further submissions made to determine which of the vendors is successful.

The recipient data processing apparatus may be required to implement other functions in order to support the tendering process. These include the provision of an on-line schedule of rates for tender submissions (S80), providing online maintenance of general rules (S82) as well as online vendor registration (S84).

In some embodiments the purchase of the tender documents which provide more details of the tender, or the deposit of security funds at the time of bid submission, may be effected by electronic-payment. These e-payments would be effected as part of steps S56 and S60 respectively in FIG. 6, although it will be appreciated that the payments could be effected in other ways. Indeed some organisations do not charge for providing tender documents. In addition, e-payments require a specific regulatory or legislative framework within a country or region in order to allow payment to be made electronically. Therefore, it will be appreciated that the electronic tender submission process illustrated in FIG. 6 can be used without electronic payment whilst still benefiting from a substantially tamper-proof security. Nevertheless a combination of e-payment and e-tender submission can provide a complete tender submission system which can utilise the convenience and efficiency of the Internet.

OTHER EMBODIMENTS

Figure 7:
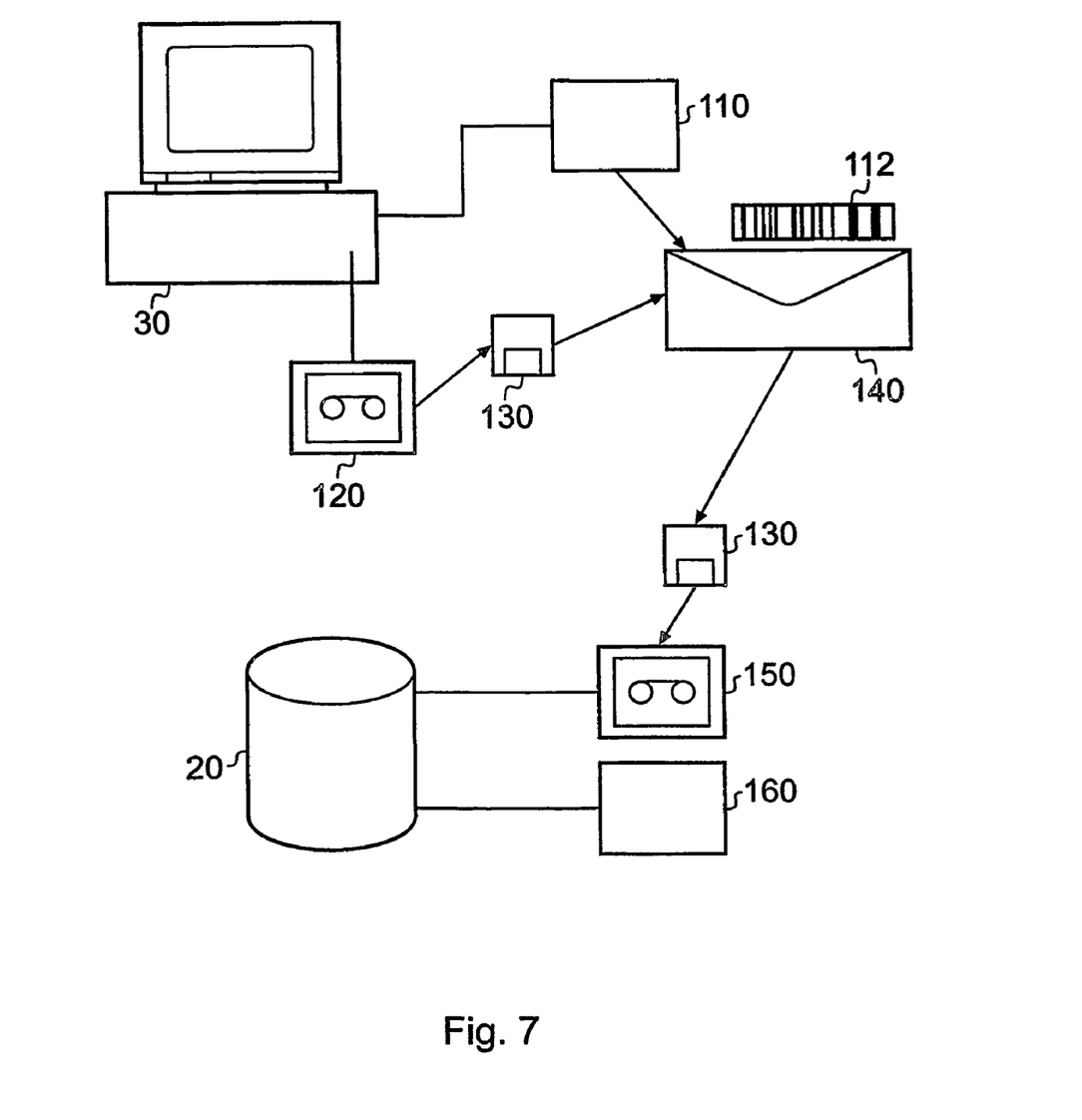
FIG. 7 is a schematic block diagram of a postal "offline" based submission process implementing the data processing system and method according to an embodiment of the invention.

Referring to FIG. 7, a postal mode of document/tender submission is illustrated. It should be understood that, in accordance with the multiple forms of document to which these systems may relate, different modes of submission need to be made available. The above-described embodiments of the invention mainly relate to online (browser based) or generic electronic document submission, but additionally offline proprietary software can optionally be provided in a tendering system to submitting clients for generating and packaging bid documents. The advantages of this offline tender document submission software are set out as follows:

Firstly, that it minimises the time spent online when preparing tender documents (important in some areas where bandwidth and connectivity can be poor or expensive such as in developing countries, rural areas, or remote locations);

Secondly, with proprietary offline software the information can be 'packaged' or converted into formats and structures that allow compatibility with the automated and decision-support features of the tendering system (e.g., automated bid comparison matrix, automated information extraction features, etc);

Thirdly, it allows for the tendering system to work in parallel with traditional manual 'paper-based' systems, thus allowing tender submitting clients, and the tender administrators, the option of a phased migration to electronic tendering;

Fourthly, when a bid is prepared with such offline software, the bidder has the option of submitting documents online (i.e., by connecting to the system server and uploading the packaged bid via the internet) or digitised but offline (e.g., by burning it on a CD or Zipdisk and posting this in a sealed envelope to the Buyer).

Note that in the offline version of bid submission, the offline software will generate the hash for that bid document. This hash value is then printed on the outside of the envelope so that it can be entered into the NT system by the buyer without the envelope being opened (which obviously is not allowed until the due date of opening of bids). Since the hash value may be approximately 50 characters long, there is a risk of data-entry error when buyers enter the hash. Therefore, buyers may be supplied with barcode scanners to easily scan and enter the hash that is printed on the outside of the envelope.

Therefore, the tamper-proof security system described covers several modes of tender submission. The choice is therefore ultimately with bidders regarding how they intend to use the system.

In the embodiment of FIG. 7, there is provided a document distribution device 30 which comprises a barcode generator 110 and a means 120 for writing to a movable storage media, such as a disk 130. Documents are prepared on the document distribution device and written to the disk 130, and a hash is generated by the barcode generator 110 and printed in the form of a barcode 112 onto an envelope 140. Once the document is written onto the disk 130, the disk is placed into the envelope 140. The envelope 140 is then sealed, and sent to the recipient. The recipient, using the recipient device 20, is able to scan the barcode on the envelope using the barcode reader 160. The envelope 140 itself will not be opened until a predetermined event has occurred, as described above. When the envelope 140 is opened, the disk 130 may be placed into a disk reader 150. The disk reader 150 is operable under control of the recipient device 20 to read the document. A hash can be generated from the document and compared to the barcode to ensure the validity of the document.

It can be appreciated that further embodiments of the present invention could include any electronic transaction or data/document exchange system that requires data to be securely stored on a server for a time period during which no one (whether counter-parties or third parties) is allowed to see the data. If the secured data is tampered with, those concerned with the security of the data can be notified.

Clearly, applications such as auctions, reverse-auctions, "book building" and other mechanisms that rely on price discovery between competing bids over a period of time, distance learning and remote examination would all benefit from the application of the present invention to them.

In so far as the embodiments of the invention described above are implemented, at least in part, using software-controlled data processing apparatus, it will be appreciated that a computer program providing such software control and a transmission, storage or other medium by which such a computer program is provided are envisaged as aspects of the present invention.

The invention claimed is:

1. A data processing system for distributing and authenticating documents, the data processing system comprising
   a plurality of document distribution devices each configured to generate an original hash value based on an electronic file containing a document to be distributed, wherein the document distribution devices collectively generate a plurality of original hash values; and
   a data communications network configured to communicate each of the original hash values to the recipient data processing apparatus before a predetermined event, the recipient data processing apparatus comprising a processor configured to generate hash values, the recipient data processing apparatus configured to:
   receive the original hash values from each of the plurality of document distribution devices via the data communication network,
   generate an original super hash value from the plurality of the original hash values received, and
   communicate the original super hash to the plurality of document distribution devices,
   wherein after the predetermined event, the plurality of document distribution devices are configured to:
   communicate each of the electronic files to the recipient data processing apparatus,
   wherein the recipient data processing apparatus is further configured to:
   generate a comparative hash value based on the electronic file containing the document received from each of the document distribution devices,
   generate a comparative super hash value from each of the comparative hash values,
   communicate the comparative super hash value to each of the document distribution devices, and
   determine whether or not each of the documents of the electronic files received from the document distribution devices have changed from a comparison of at least one of the original hash values and the comparative hash values, and the comparative super hash value and the original super hash value.

2. The data processing system according to claim 1, wherein the recipient data processing apparatus is configured to identify a document which has changed by comparing each original hash value with the corresponding comparative hash value, and, if the comparative hash value is not the same as the original hash value, to determine that the corresponding document has changed.

3. The data processing system according to claim 1, wherein the original hash value generated by a document distribution device is encrypted using a private key associated with the document distribution device.

4. The data processing system according to claim 2, wherein the super hash value to be communicated to the document distribution devices is encrypted using a private key associated with the recipient data processing apparatus.

5. The data processing system according to claim 1, wherein the electronic file containing the document to be distributed is encrypted using a public key associated with the recipient data processing apparatus prior to being communicated to the recipient data processing apparatus.

6. The data processing system according to claim 1, wherein the predetermined event includes expiration of a time limit on a particular date.

7. The data processing system as claimed in claim 1, wherein the electronic file is created by an application program.

8. The data processing system as claimed in claim 7, wherein the electronic file is communicated as part of an e-mail.

9. The data processing system as claimed in claim 7, wherein the electronic file is communicated on a portable data storage medium to the recipient data processing device via a postal service.

10. The data processing system as claimed in claim 9, wherein the original hash value is represented as a bar code, the bar code being arranged in association with the portable data storage medium, and wherein the recipient data processing apparatus includes a storage medium reader configured to reproduce the electronic file from the portable data storage medium, and a bar code reader for reproducing the original hash value from the bar code associated with the portable data storage medium, the electronic file representing the document being stored in association with the hash value in a data store.

11. The data processing system as claimed in claim 7, wherein the document is generated from an on-line browser, and wherein the data communications network includes one of an intranet and the Internet.

12. A recipient data processing device configured to authenticate documents received from a plurality of document distribution devices via a data communications network, the recipient data processing device comprising:
   a communications interface configured to receive a plurality of original hash values from the document distribution devices via the data communication network before a predetermined event, wherein the hash values are each generated based on an electronic file containing one of the documents; and
   a data processing apparatus comprising a processor configured to generate an original super hash value from the plurality of the received original hash values, and communicate the original super hash value to each of the document distribution devices, wherein the data processing apparatus is configured to operate in combination with the communications interface to:
   receive, after the predetermined event, a plurality of electronic files from the document distribution devices, each of the electronic files containing one of the documents,
   generate a comparative hash value based on the electronic file received from each of the document distribution devices,
   generate, using the processor, a comparative super hash value from each of the comparative hash values,
   communicate the comparative super hash value to the document distribution devices, and
   determine whether or not each of the documents of the electronic files received from the document distribution devices have changed based on a comparison of at least one of the original hash values and the comparative hash values, and the comparative super hash value and the original super hash value.

13. The recipient data processing apparatus as claimed in claim 12, wherein the data processing apparatus is configured to identify a document which has changed by comparing each original hash value with the corresponding comparative hash value, and if the comparative hash value is not the same as the original hash value, determine that the corresponding document has changed.

14. The recipient data processing apparatus as claimed in claim 12, wherein the original hash values received from the document distribution devices are encrypted using a private key associated with each document distribution device, and wherein the recipient data processing apparatus comprises
an encryption processor configured to decrypt the original hash values using a public key associated with the document distribution device.

15. The recipient data processing apparatus according to claim 14, wherein the encryption processor is configured to encrypt the original super hash value and the comparative super hash to be communicated to the document distribution devices in encrypted form.

16. The recipient data processing apparatus according to claim 12, wherein the encryption processor is configured to decrypt the electronic file representing the distributed document using a public key associated with the document distribution devices.

17. The recipient data processing apparatus according to claim 12, comprising a data storage medium reader configured to reproduce the electronic file from the portable data storage medium, and a bar code reader for reproducing the original hash value from the bar code associated with the portable data storage medium, the electronic file representing the document being stored in association with the hash value in a data store.

18. The recipient data processing apparatus as claimed in claim 12, wherein the communications interface includes an on-line browser facility for generating the document, and wherein the data communications network includes one of an intranet and the Internet.

19. A computer-implemented method for distributing documents, the computer-implemented method comprising:
generating a plurality of original hash values, each original hash value based on one of a plurality of electronic files, each file representing a document to be distributed;
communicating the original hash values to the recipient data processing apparatus before a predetermined event via a data communications network;
generating, at the recipient data processing apparatus, an original super hash value based on the plurality of the original hash values;
communicating the original super hash value to a plurality of document distribution devices; and, after the predetermined event,
communicating, from the plurality of document distribution devices, each of the electronic files representing a document to the recipient data processing apparatus;
generating, at the recipient data processing apparatus, a comparative hash value based on the electronic files representing the documents received from the document distribution devices;
generating a comparative super hash value from each of the comparative hash values; and
determining whether or not each of the documents of the electronic files received from the document distribution devices have changed based on a comparison of at least one of the original hash values and the comparative hash values, and the comparative super hash value and the original super hash value.

20. The data processing method according to claim 19, further comprising:
identifying a document which has changed by comparing each original hash value with the corresponding comparative hash value, and if the comparative hash value is not the same as the original hash value, determining that the corresponding document has changed.

21. The method as claimed in claim 20, further comprising:
receiving, from the recipient data processing apparatus, an original super-hash value generated by the recipient data processing apparatus from a combination of the original hash value communicated by the data processing apparatus and a hash value generated by at least one other document distribution device; and
receiving a comparative super hash value generated by the recipient data processing apparatus from the electronic document received from the document distribution apparatus and at least one other electronic document received from the at least one other document distribution device.

22. A method of authenticating documents received from a plurality of document distribution devices via a data communications network, the method comprising:
receiving a plurality of original hash values from the document distribution devices, before a predetermined event, via the data communication network, each original hash value based on one of a plurality of electronic files, each file containing a document to be distributed;
generating an original super hash value from the plurality of the original hash values received;
communicating the original super hash value to each of the document distribution devices;
receiving, after the predetermined event, a plurality of electronic files from the document distribution devices, each received electronic file;
generating a comparative hash value based on the received electronic file;
generating a comparative super hash value from each of the comparative hash values;
communicating the comparative super hash value to the document distribution devices; and
determining whether or not each of the documents of the received electronic files from the document distribution devices have changed based on a comparison of at least one of the original hash values, and the comparative hash value and the comparative super hash value and the original super hash value.

23. A non-transitory computer readable medium having a program for executing a method of authenticating documents received from a plurality of document distribution devices via a data communications network, the method comprising:
receiving a plurality of original hash values from the document distribution devices, before a predetermined event, via the data communication network, each original hash value based on one of a plurality of electronic files, each electronic file containing a document to be distributed;
generating an original super hash value from the plurality of the original hash values received;
communicating the original super hash value to each of the document distribution devices;
receiving, after the predetermined event, the plurality of electronic files from the document distribution devices;
generating a comparative hash value based on the received electronic files;
generating a comparative super hash value from each of the comparative hash values;
communicating the comparative super hash value to the document distribution devices; and
determining whether or not each of the documents of the received electronic files from the document distribution devices have changed based on a comparison of at least one of the original hash values, and the comparative hash value and the comparative super hash value and the original super hash value.

24. A data processing apparatus for distributing documents from a plurality of document distribution devices to a recipient data processing apparatus, the data processing apparatus comprising:

means for generating, for each of the plurality of document distribution devices, a plurality of original hash values each original hash value based on one of a plurality of electronic files, each file representing a document to be distributed;

means for communicating the original hash values to the recipient data processing apparatus, before a predetermined event, via a data communications network;

means for generating, at the recipient data processing apparatus, an original super hash value based on the plurality of original hash values;

means for communicating the original super hash to the plurality of document distribution devices;

means for communicating, after the predetermined event, from the plurality of document distribution devices, each of the electronic files representing a document to the recipient data processing apparatus;

means for generating, after the predetermined event, at the recipient data processing apparatus, a comparative hash value based on the electronic files representing the documents received from the document distribution devices;

means for generating, after the predetermined event, a comparative super hash value from each of the comparative hash values; and means for determining whether or not each of the documents of the electronic files received from the document distribution devices have changed based on a comparison of at least one of the original hash values and the comparative hash values, and the comparative super hash value and the original super hash value.

* * * * *